US007698741B2

(12) United States Patent
Marinescu et al.

(10) Patent No.: US 7,698,741 B2
(45) Date of Patent: Apr. 13, 2010

(54) CONTROLLING THE ISOLATION OF AN OBJECT (75) Inventors: Adrian Marinescu, Issaquah, WA (US); Neill M Clift, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1162 days.

(21) Appl. No.: 11/294,835

(22) Filed: Dec. 6, 2005

(65) Prior Publication Data
US 2007/0130621 A1 Jun. 7, 2007

(51) Int. Cl.
G06F 21/24 (2006.01)
G06F 17/30 (2006.01)
(52) U.S. Cl. .................... 726/22; 726/2; 726/23
(58) Field of Classification Search ........... 726/22–24
See application file for complete search history.

(56) References Cited

U.S. PATENT DOCUMENTS

2002/0133809 A1* 9/2002 Hills .................... 717/136
2005/0091346 A1* 4/2005 Krishnaswami et al. ..... 709/220

OTHER PUBLICATIONS

"Kernel Object Namespaces". Proceedings of the I.E.E.E. Symposium on Research in Security and Privacy, Oakland. Aug. 3, 2003. Available at http://web.archive.org/web/20030803182352/http://msdn.microsoft.com/library/en-us/termserv/termserv/kernel_object_namespaces.asp. Downloaded May 1, 2009.*

* cited by examiner

*Primary Examiner*—Eleni A Shiferaw
*Assistant Examiner*—Travis Pogmore
(74) *Attorney, Agent, or Firm*—Wolf, Greenfield & Sacks, P.C.

(57) ABSTRACT

Generally described, a method, software system, and computer-readable medium are provided for preventing a malware from colliding on a named object. In accordance with one aspect, a method is provided for creating a private namespace. More specifically, the method includes receiving a request to create a private namespace that contains data for defining the boundary of the private namespace from the current process. Then a determination is made regarding whether a principle associated with the current process has the security attributes that are alleged in the request. In this regard, if the principle that is associated with the current process has the security attributes that are alleged in the request, the method creates a container object to implement the private namespace that is defined by the data received in the request.

17 Claims, 4 Drawing Sheets

CONTROLLING THE ISOLATION OF AN OBJECT

BACKGROUND

As more and more computers and other computing devices are interconnected through various networks, such as the Internet, computer security has become increasingly more important, particularly from invasions or attacks delivered over a network or over an information stream. As those skilled in the art will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will realize that the various computer attacks are technically distinct from one another, for purposes of the present invention and for simplicity in description, all malicious computer programs will be generally referred to hereinafter as computer malware, or more simply, malware.

Those skilled in the art and others will recognize that malware may become resident on a computer using a number of techniques. For example, a computer connected to the Internet may be attacked so that a vulnerability on the computer is exploited and the malware is delivered over the network as an information stream. By way of another example, malware may become resident on a computer using social engineering techniques. For example, a user may access a resource such as a Web site and download a program from the Web site to a local computer. While the program may be described on the Web site as providing a service desirable to the user; in actuality, the program may perform actions that are malicious.

When a computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer is used to infect other systems.

A traditional defense against computer malware, and particularly computer viruses and worms, is antivirus software. Generally described, antivirus software scans incoming data, looking for identifiable patterns associated with known computer malware. Also, increasingly, antivirus software is utilizing heuristic techniques that compare incoming data with characteristics of known malware. In any event, upon detecting a computer malware, the antivirus software may respond by removing the computer malware from the infected data, quarantining the data, or deleting the infected incoming data. However, as antivirus software has become more sophisticated and efficient at recognizing thousands of known computer malware, so, too, have the computer malware become more sophisticated.

In one type of attack, a named object that is typically created by a legitimate program or service is created by a malware before the legitimate program or service. Those skilled in the art and others will recognize that legitimate programs frequently create and use objects to implement functionality of the program including, but certainly not limited to, transferring data between principles of differing identities, inter-process communication, process synchronization, and the like. At a minimum, malware that preemptively creates a named object before a legitimate program has the opportunity to create the object, causes a denial of service problem. In this regard, the legitimate program will not be able to implement program functionality in instances when an object with a specified name was previously created by malware. Moreover, the object may be used to communicate sensitive data, such as user passwords, between a user and malware. In this instance, malware that creates the object before the legitimate program may obtain the sensitive data and use the data to elevate privileges for the purpose of implementing other types of attacks.

More generally, operating systems are increasingly configured to serve multiple users; each user having a different user profile that defines a computer configuration with regard to that user. In these types of operating systems, each user has the authority to access a defined set of resources which may be implemented internally as a named object. Unfortunately, users of a computer system may attempt to create the same named object, resulting in a "collision" in the use of the object. For example, two or more users in a multi-user environment may use the same application program to implement desired functionality. As part of normal operations, the application program may attempt to create an object with the same name for each user. In this instance, after the named object has been created by a first user, a second user of the application program may access program functionality that causes the program to attempt to create the same named object. In this instance, an operating system may not allow two objects to be created with the same name thereby resulting in an error condition.

In any event, a number of different scenarios exist, examples of which are provided above, in which "collisions" on a named object may occur. In some instances, a collision on a named object is deliberate and used by malware to implement malicious functionality. In other instances, the collision on a named object is merely an error that is not anticipated by users or developers. In either case, collisions on named objects reduce the usability of a computer system. While specific disadvantages of existing systems have been illustrated and described in this Background Section, those skilled in the art and others will recognize that the subject matter claimed herein is not limited to any specific implementation for solving any or all of the described disadvantages.

SUMMARY

Generally described, a method, software system, and computer-readable medium are provided for preventing "collisions" on a named object. In accordance with one aspect, a method is provided for creating a private namespace in which objects may be inserted and later recalled. More specifically, the method includes receiving a request to create a private namespace that contains data for defining the boundary of the private namespace from the current process. Then a determination is made regarding whether a principle associated with the current process has the security attributes that are alleged in the request. In this regard, if the principle that is associated with the current process has the security attributes that are alleged in the request, the method creates a container object to implement the private namespace that is defined by the data received in the request.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention may be described in the general context of computer-executable instructions, such as program modules, being executed by a computer. Generally described, program modules include routines, programs, applications, widgets, objects, components, data structures, and the like that perform particular tasks or implement particular abstract data types. Moreover, the present invention may also be practiced in distributed computing environments where tasks are performed by remote processing devices that are linked through a communications network. In a distributed computing environment, program modules may be located on local and/or remote computer storage media.

While the present invention will primarily be described in the context of preventing "collisions" on a named object, those skilled in the relevant art and others will recognize that the present invention is also applicable to other areas than those described. In any event, the following description first provides a general context and system in which aspects of the present invention may be implemented. Then methods that implements aspects of the invention are described. The illustrative examples described herein are not intended to be exhaustive or to limit the invention to the precise forms disclosed. Similarly, any steps described herein may be interchangeable with other steps or combinations of steps in order to achieve the same result.

As used herein, a program or component of a program that is scheduled to be executed by a central processing unit ("CPU") on a computer will be referred to as a "process." Those skilled in the art and others will recognize that a process generally corresponds to a program, but a program may have multiple processes that perform tasks on behalf of the program. Moreover, multitasking between different processes may be performed by allocating time slices to individual processes and performing a context switch to a subsequently scheduled process when the time slice of an executing process expires. In this regard, data associated with a process may be "swapped" in and out of system memory so that program instructions may be executed by the CPU. From a user's perspective multiple programs appear to execute concurrently on the same hardware resources.

In one aspect, a process may be regarded as an internal representation of a program or a program subcomponent that is associated with a set data. In general terms, the data associated with the process may be divided into several categories including, but not limited to: (1) resources that are allocated to the process (e.g., handles, virtual memory, etc.); (2) security attributes (e.g., process owner, permissions, and the like); (3) and a process state or context. As described in further detail below, data associated with a process may be used to define a private namespace that is capable of holding objects for use in implementing program functionality.

Now with reference to FIG. 1 an exemplary timeline 100 that may be used to describe how two processes on a computer may use a named object to implement legitimate program functionality will be described. By way of example only, FIG. 1 and the associated description illustrates events that are performed by two processes in regard to performing a "backup" of data from a primary to a secondary storage medium. In this example, a program is designed to obtain data from the user regarding how the "backup" of data will be performed. Then, when processing on the computer is idle, the copying of data from the primary to the secondary storage medium is performed.

Figure 1:
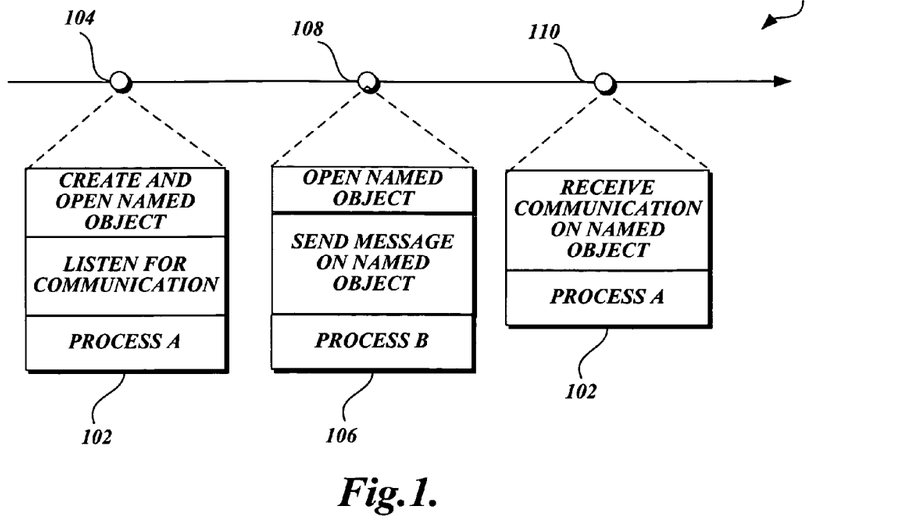
FIG. 1 is a pictorial depiction of an exemplary timeline that may be used to describe how two or more processes in a computer may use an object to implement legitimate program functionality.

In the example illustrated in FIG. 1, "PROCESS A" 102 causes instructions to be executed periodically for the purpose of performing a "backup" on a computer. In some types of systems, a "backup" is performed when computer resources are likely to be under-utilized such as when a user will not be executing resource intensive application programs. In the example illustrated in FIG. 1, "PROCESS A" 102 is scheduled periodically for the purpose of executing instructions that will cause data to be copied from a primary storage medium to a secondary storage medium at a time when computer resources are known to be under-utilized. In this regard, at event 104, "PROCESS A" 102 creates and opens a named object and uses the named object to listen for communication from other processes. Those skilled in the art and others will recognize that a "named object" may be used to implement many different types of program functionality. So, for example, a named object may be used to implement inter-process communication between processes that will execute at disparate periods of time. Moreover, those skilled and others will recognize that examples of "named objects" implemented in some computer systems include, but are not limited to, pipes, events, sockets, memory mapped objects, and the like. Nonetheless, in this example, "PROCESS A" 102 implements program functionality to create a named object and listen for communication from other processes, at event 104.

In the example illustrated in FIG. 1, "PROCESS B" 106 provides a user interface for obtaining data from the user and communicates this data to "PROCESS A" 102 so that a backup of the data identified by the user may be performed. Moreover, "PROCESS B" 106 is event-driven and executed when directed by the user through the use of a user interface. In any event, "PROCESS B" 106 obtains a set of configuration data from the user regarding how a backup of the data will be performed. Also, since "PROCESS A" 102 will be required to "login" to the computer using the same credentials as the user in order to perform the backup, "PROCESS B" 106 obtains the user's username and password. Then, at event 108, "PROCESS B" 106 opens the same named object that was created by "PROCESS A" 102 at event 104, and sends a message using the named object. In this example, the message would include the configuration data for the backup and the user's username and password.

As mentioned previously, "PROCESS A" 102 is scheduled periodically for the purpose of executing instructions that will cause a backup of data identified by the user to be performed. At event 110, the periodic scheduling of "PROCESS A" 102 re-occurs so that data may be copied to the secondary storage medium at a time when resources on computer are under-utilized. In this regard, at event 110, the data obtained from the user by "PROCESS B" 106 at event 108 is communicated to "PROCESS A" 102 using the named object that was created at event 102.

Now with reference to FIG. 2 an exemplary timeline 200 that may be used to describe how a process associated with malware may create a named object for the purpose of implementing malicious functionality will be described. Similar to the description provided above with reference to FIG. 1, an application program implements "PROCESS A" 102 and "PROCESS B" 106 for the purpose of performing a backup of data. However, in this example, "PROCESS C" 200 instantiates the named object with an identifier that is known to be used by "PROCESS A" 102 and "PROCESS B" 106 to communicate. More specifically, as illustrated in FIG. 1, at event 202 "PROCESS "C 200 creates and opens a named object with the same identifier that is known to be used by "PROCESS A" 102 and "PROCESS B" 106. Moreover, "PROCESS "C 200 implements program code for listening on the named object for any communication that may be made by another process.

Figure 2:
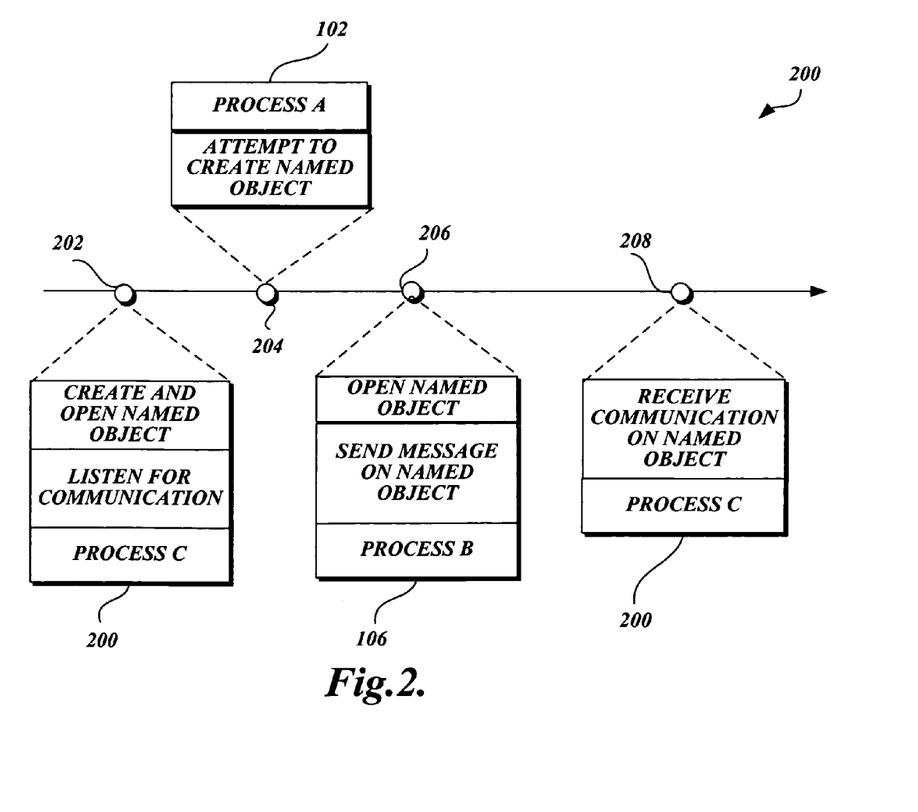
FIG. 2 is a pictorial depiction of an exemplary timeline that may be used to describe how a process associated with malware may create a named object for the purpose of implementing malicious functionality.

In the example illustrated in FIG. 2, at event 204, "PROCESS A" 102 attempts to create the named object that is used to listen for communications from legitimate processes. However, in this example, since the identifier used to instantiate the named object was previously created by "PROCESS C" 200, at event 202, the call to create the named object, at event 204, does not succeed.

Similar to the description provided above with reference to FIG. 1, "PROCESS B" 106 obtains a set of configuration data from the user regarding how a backup of the data will be performed. Also, "PROCESS B" 106 obtains the user's username and password for the purpose of allowing "PROCESS A" 102 to login to the computer. Then, at event 206, "PROCESS B" 106 opens the same named object that was created by "PROCESS C" 200 (at event 202) and sends a message using the named object. In this example, the message includes the configuration data and the user's username and password. Finally, at event 208, when "PROCESS C" 200 is scheduled for execution, "PROCESS C" 200 receives the data on the named object that was sent by "PROCESS B" 106 at event 206. In this instance, a process associated with malware ("PROCESS C" 200) managed to create a named object before a legitimate program for the purpose of intercepting sensitive data. When the sensitive data is intercepted, "PROCESS C" 200 may perform unauthorized and/or malicious acts on behalf of "PROCESS B" 106 using the username and password. Moreover, those skilled in the art and others will recognize that, in other instances, sensitive data may be obtained implicitly by an unauthorized process based on the security context in which communication on a named object is performed. Thus, FIG. 2 and the associated description provides one example in which a malware may implement "name squatting" for the purpose of executing malicious functionality on a computer. However, there are other ways in which the "name squatting" may be implemented in which sensitive data is intercepted and the example provided above should be construed as exemplary and not limiting.

Figure 3:
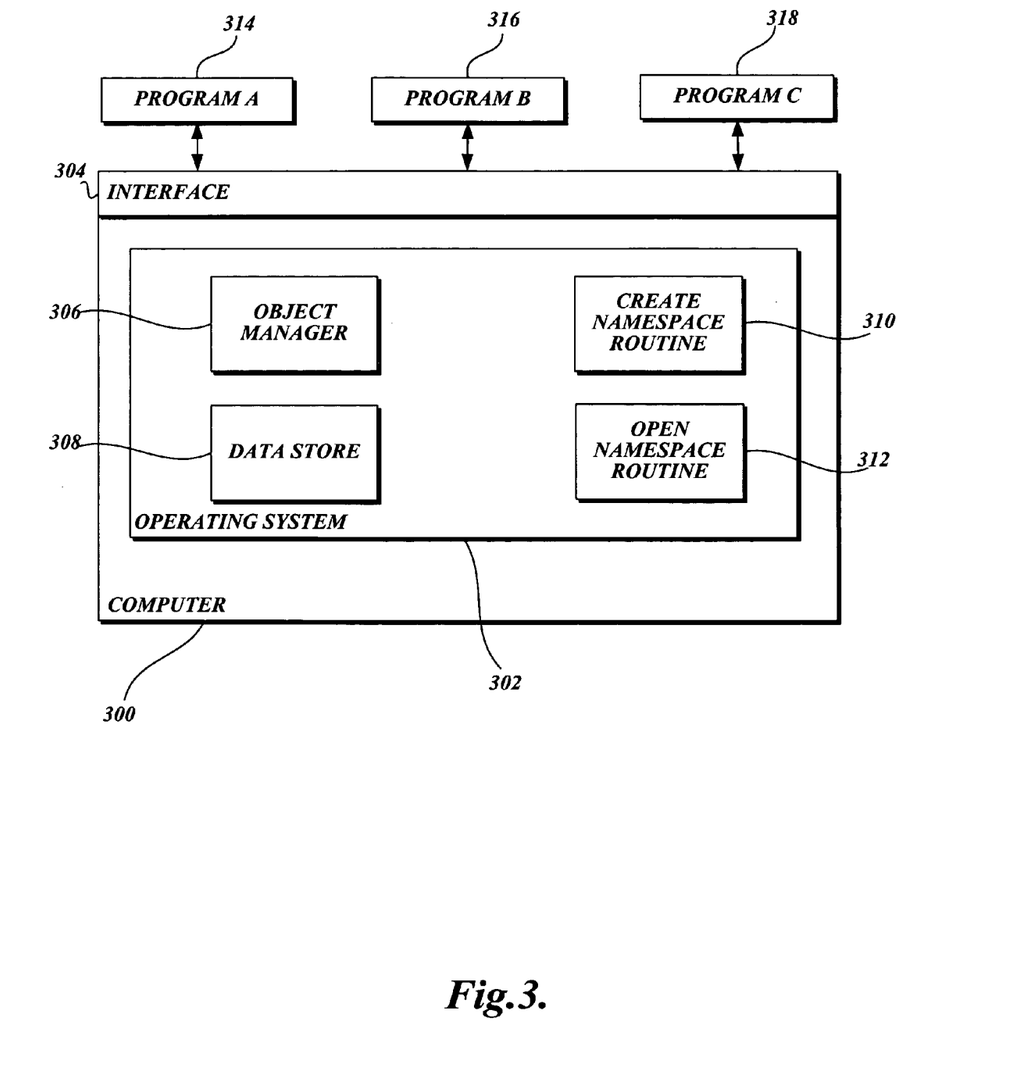
FIG. 3 is an exemplary block diagram of a computer that illustrates an environment in which aspects of the present invention may be implemented.

Now with reference to FIG. 3, an exemplary architecture of a computer 300 that is capable of implementing aspects of the present invention will be described. Those skilled in the art and others will recognize that the computer 300 illustrated in FIG. 3 may be any one of a variety of devices including, but not limited to, personal computing devices, server-based computing devices, mini- and mainframe computers, laptops, personal digital assistants ("PDAs"), or other electronic devices having some type of memory. For ease of illustration and because it is not important for an understanding of the present invention, FIG. 3 does not show the typical components of many computers, such as a memory, keyboard, a mouse, a printer, or other I/O devices, a display, etc. However, as illustrated in FIG. 3, the computer 300 does include an operating system 302 that maintains an interface 304, an object manager 306, a data store 308, a create namespace routine 310, and an open namespace routine 312. Moreover, installed on the computer are three programs, namely "PROGRAM A" 314, "PROGRAM B" 316, and "PROGRAM C" 318 that are configured to communicate with the interface 304 in order to obtain services from the operating system 302.

As illustrated in FIG. 3, the computer 300 includes an operating system 302 which may be a general-purpose operating system, such as a Microsoft® operating system, UNIX® operating system, or Linux® operating system. Alternatively, the operating system 302 may be a specialized operating system designed specifically for a computer that maintains non-generic hardware. Those skilled in the art and others will recognize that, in some instances, an operating system in which aspects of the present invention is implemented may not have the same component architecture as described below. For example, some operating systems do not maintain a separate component that performs the functions of the object manager 306. Instead, the functionality of the object manager 306, is performed and/or integrated with other types of components in the operating system 302. In any event, the operating system 302 controls the general operation of the computer 300 and is responsible for executing programs. Moreover, the operating system 302 provides services to programs installed on the computer such as "PROGRAM A" 314, "PROGRAM B" 316, and "PROGRAM C" 318 that typically include certain core services including, but not limited to, input/output memory management, process scheduling, and the like. Typically, services provided by the operating system 302 are accessible using the interface 304 which defines a set of callable functions in an application programming interface ("API"). Generally described, APIs form a layer of software that defines the set of services offered by an operating system 302 to programs installed on the computer 300.

In order to provide core services to programs installed on the computer, the operating system 302 maintains an object manager 306. Those skilled in the art and others will recognize that functionality provided by the operating system 302 is frequently implemented internally as "objects." In this regard, some high-level programming languages are "object oriented" in that actions performed by the operating system are implemented in objects that are instantiated from a class. The object manager's 306 duties involve creating and deleting object types, querying and setting an object's attributes, and locating objects. For example, a process associated with "PROGRAM A" 314 may need to perform inter-process communication with a process that is associated with "PROGRAM B" 316. In this instance, program code implemented by "PROGRAM A" 314 may issue an API call to the interface 304 of the operating system 302 for the purpose of creating an object (e.g., a pipe, event, socket, etc) that may be used to perform inter-process communication. In this instance, the object manager 306 creates the object and causes a handle to be returned to the calling process so that the object may be referenced by other processes.

Increasingly, operating systems are configured to serve multiple users; each user having a different user profile that defines a computer configuration with regard to that user. Multiple user scenarios are especially prevalent in networking environments in which users share data. Moreover, certain types of users may be provided with a greater authority to perform actions on the computer than others. For example, some operating systems support a "super user" that, when logged into the computer 300, is allowed to perform privileged actions such as installing software on the computer 300. By way of another example, in some instances, an operating system will create a privilege process for performing administrative tasks on the computer. Since the process originated from the operating system 302 and is therefore highly trusted, the actions performed by the process are given elevated privileges. In this type of system, the operating system 302 tracks which users and/or software components may access certain resources on the computer 300. For example, computer operating systems maintain access control lists ("ACLs") that define which users, groups of users, or domains (hereinafter collectively referred to as "principles") may access particular resources. For the purpose of tracking and determining whether a principle may access a resource, the operating system 302 will typically cause users to "login" into the computer so that the user's identity may be verified. For purposes of the present application, the authority to access resources and perform actions on the computer 300 that are associated with a principle will be generally referred to as the "security attributes" of the principle. Those skilled in the art in others will recognize that security attributes associated with a principle are stored in one or more data structures that are maintained by the operating system 302.

As illustrated in FIG. 3, the operating system 302 includes a create namespace routine 310. Since different aspects of the create namespace routine 310 are described in further below with reference to FIG. 4, a detailed description of the routine 310 will not be provided here. However, generally described, the routine 310 allows a process to create a private namespace in which objects may be inserted. In this regard, when a call to create the private namespace is received, the create namespace routine 310 receives a set of data that describes the alleged security attributes of a principle that owns the current process. The data that describes the alleged security actually attributes is stored in the data store 308 where it is accessible to the create namespace routine 310. In accordance with one embodiment, the routine 310 validates whether the actual security attributes of the calling process are the same as the alleged security attributes that were received in the call to create the private namespace. In instances when the actual and alleged security attributes are the same, the create namespace routine 310 generates a container object to implement the private namespace. Conversely, if the actual and alleged security attributes are different, the call to create the private namespace does not succeed.

Once a private namespace has been created, objects may be inserted into the namespace automatically by the operating system 302 when a call to the interface 304 is received. For example, as mentioned previously, the operating system 302 provides services for creating objects and using the objects to perform a variety of functions including, but not limited to, inter-process communication, process synchronization, and the like. In accordance with one embodiment of the present invention, when a call is made to the operating system 302 to create an object, the call may specify that the object is to be located in a private namespace. In this instance, the operating system 302 is configured to insert the object into a container object that is used to implement the private namespace. Then, if additional calls to perform an action on the object are received, the operating system 302 accesses the object from the container object that defines the boundary of the private namespace.

As further illustrated in FIG. 3, the operating system 302 includes an open namespace routine 312 for providing authorized principles with access to objects that are contained in a private namespace. Since different aspects of the open namespace routine 312 are described in further below with reference to FIG. 5, a detailed description of the routine 312 will not be provided here. However, generally described, when a process needs to access an object that is in a private namespace, a call is initially issued to the operating system 302 to "open" the private namespace. In accordance with one embodiment, the call includes security attributes for the expected owner of the private namespace. When the call is received, the open namespace routine 312 validates that the security attributes for the owner of the private namespace matches the expected security attributes. In instances when the actual and expected security attributes match, the open namespace routine 312 causes a container object that holds objects in a private namespace to become available to the calling process. In this instance, functionality and data provided by objects in the private namespace may be accessed. For example, the interface 304 may receive additional API calls that are directed to an object in the opened private namespace for the purpose of using the object.

FIG. 3 is a simplified example of one exemplary computer 300 with components that are capable of performing the functions of the present invention. However, actual embodiments of a computer that implements the present invention may, and typically will, have additional components not illustrated in FIG. 3 or described in the accompanying text. Also, FIG. 3 shows one component architecture of a computer 300 that may be used to implement the present invention. In this regard, for the sake of convenience, FIG. 3 illustrates a computer that has a specific component configuration. However, those skilled in the art and others will recognize that the present invention may be practiced with many other computer system configurations.

Now with reference to FIG. 4, an exemplary embodiment of a create namespace routine 310, briefly mentioned above with reference to FIG. 3 will be described in further detail. As a preliminary matter and in accordance with one embodiment, the create namespace routine 310 is executed when a program issues an API call to an operating system installed on a computer for the purpose of creating a private namespace. By creating a private namespace and inserting objects into the namespace, the program ensures that malware may not preempt the use of a named object by a legitimate program. For example, when a private namespace is created, a validation of the security attributes associated with a principle is performed by the create namespace routine 310. Since the security attributes that are validated are unique, malware may not create a private namespace with the same security attributes. As a result, when an object from a private namespace is accessed, certainty exists that the object was created by a principle that maintains a known set of security attributes.

Figure 4:
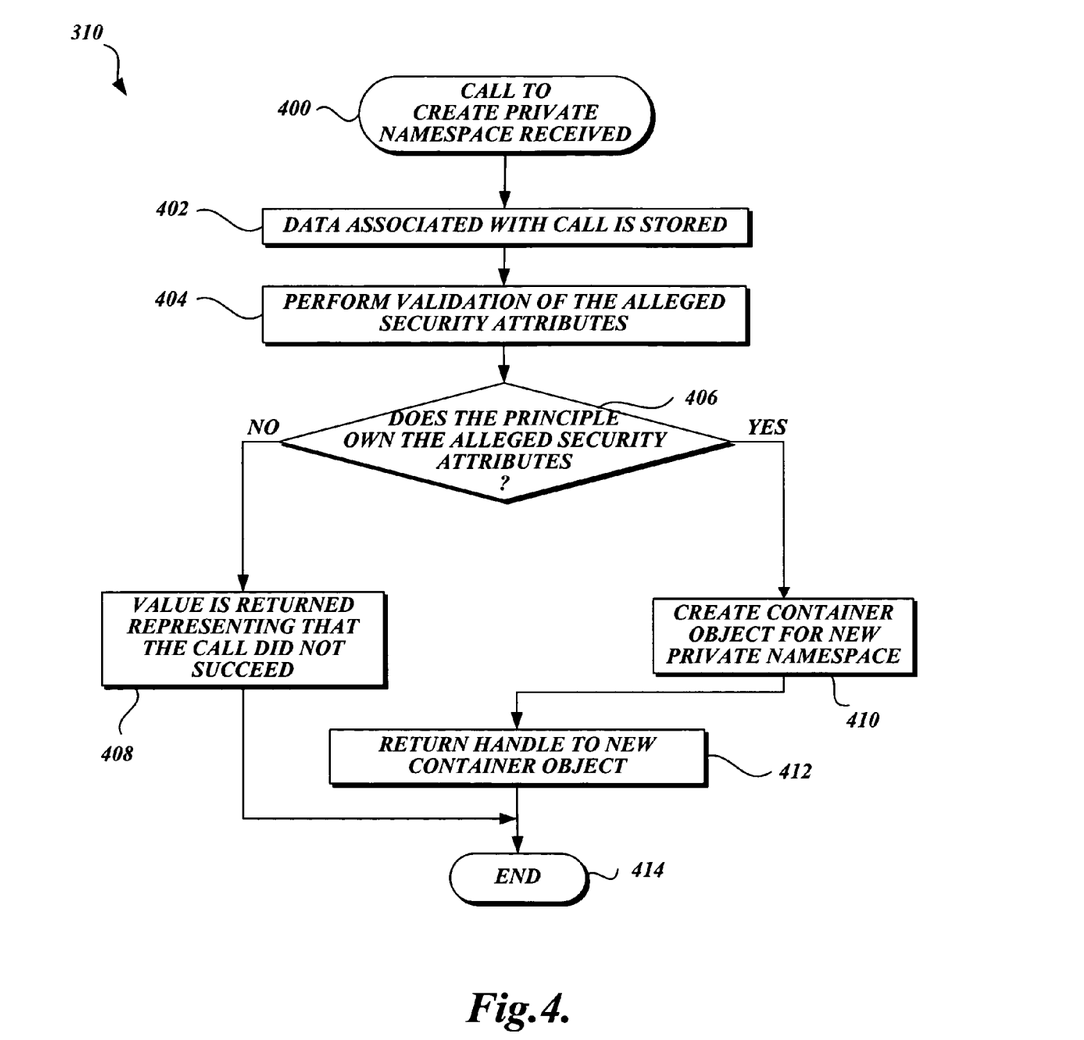
FIG. 4 is a pictorial depiction of an exemplary flow diagram for creating a private namespace that allows another principle to validate the properties of the environment in which the private namespace was created.

As illustrated in FIG. 4, the create namespace routine 310 begins at block 400 where a call to create a private namespace is received. As mentioned previously, in one embodiment, the create namespace routine 310 begins when a program issues an API call to the interface of an operating system for the purpose of creating a private namespace. For example, in the context of FIG. 3, "PROGRAM A" 314 may issue a call to the interface 304 to create a private namespace. In response, the create namespace routine 310 performs the necessary actions to create the namespace. However, those skilled in the art and others will recognize that the create namespace routine 310 may be executed in other instances and the description provided above at block 400 should be construed as exemplary and not limiting.

At block 402, the create namespace routine 310 causes a set of data that includes the arguments in the API call received at block 400 to be stored in a data store. For example, the data store 308 illustrated in FIG. 3, may be configured to store and recall data when needed by the create namespace routine 310. In one embodiment, the data in the call received at block 400 includes, but is not limited to, a name assigned to the private namespace, data that describes the alleged security attributes of the principle that owns the current process, and a descriptor that defines the principles that may access objects in the private namespace.

The name assigned to the private namespace is set in the call to create the private namespace and is merely used by developers to identify the private namespace and access objects contained in the private namespace. In this regard, the name assigned to a private namespace may be shared with other processes that need to access objects in the private namespace.

The data that describes the alleged security attributes of the principle that owns the current process where the call originated is used by the create namespace routine 310 to perform a validation of the source of the call. In this regard, in some operating systems, access to resources is based on Access Control Lists ("ACLs") that use security identifiers ("SIDs") to uniquely identify a principle. For example, when a user requests access to a resource, a SID associated with the user may be compared to an ACL that describes which principles may access the resource. If the process where the request originated is associated with a principle that is allowed to perform the requested action, the request is satisfied. If a private namespace is created, one or more security attributes associated with a principle may be used to define a boundary of the namespace.

As mentioned above, a descriptor that defines the required attributes of a principle to access an object in a private namespace is obtained when a call to create private namespace is received. In accordance with one aspect of the present invention, a principle that creates a private namespace may place restrictions on the way in which other principles may access objects that are contained in the namespace. In this regard, data that describes the attributes required to access an object contained in a private namespace is obtained and stored, at block 402, when a call to create a private namespace is received.

As illustrated in FIG. 4, at block 404, the create namespace routine 310 performs a validation of the alleged security attributes that are associated with the principle that owns the current process. As described above, when a call to create a private namespace occurs, data that describes the alleged security attributes of a principle that owns the current process is obtained. In accordance with one embodiment, the create namespace routine 310 performs a lookup, at block 404, to determine whether the alleged security attributes obtained when a call to create a private namespace is received are accurate. Those skilled in the art and others will recognize that some operating systems assign and track security attributes that are associated with principles. For example, as mentioned previously, a SID is a unique character string that is assigned to a user, group of users, or other type of principle. In this regard, a SID is used internally by some operating systems to determine the level of privileges and access permissions with regard to resources on the computer. In one embodiment, at block 404, the alleged SID that is obtained in the call to create the private namespace, at block 400, is compared to the SID of the current process that is tracked by the operating system. Through this comparison, the create namespace routine 310 is able to determine whether the alleged security attributes received in the call are accurate.

It should be well understood that the comparison performed at block 404 occurs when the operating system is in a protected and/or privileged context. Those skilled in the art and others will recognize that some operating systems complete tasks in user mode or in kernel mode. When in user mode, components of the operating system generally perform tasks relating to application programs and operate in an unprivileged security context. In this unprivileged security context, the computer system imposes only limited constraints on the operating system components. When in kernel mode, operating system components generally performs tasks relating to managing hardware devices, device drivers, and other tasks not directly relating to application programs. As a result, kernel mode components generally operate in a privileged security context in which the components are able to access hardware directly, read from and write to memory outside the components' address space, and control other resources. In one embodiment of the present invention, the validation of the alleged security attributes is performed, at block 404, when the operating system is in kernel mode. As a result, a trusted component of the operating system performs the validation of the alleged security attributes.

At decision block 406, the create namespace routine 310 determines whether the security principle that owns the current process maintains the alleged security attributes. As mentioned previously, a comparison is performed, at block 404, between the actual and alleged security attributes. If the security attributes were accurately reported in the call received at block 400, the create namespace routine 310 proceeds to block 410 described in further detail below. Conversely, if the security attributes were not accurately reported in the call received at block 400, the create namespace routine 310 proceeds to block 408.

At block 408 a value is returned to the current process that indicates the call to create the private namespace did not succeed. If block 408 is reached the actual security attributes of a principle as tracked by an operating system are different than the security attributes reported in an API call. In this instance, the security attributes were not accurately reported by the calling process and a private namespace will not be created. Those skilled in the art and others will recognize that when an API call is generated, data may be communicated back to the calling process, for example, as a return value. In one embodiment of the present invention, the create namespace routine 310 returns a value back to the calling process which indicates that the call to create the private namespace did not succeed. Since communicating data that indicates the call to create the private namespace did not succeed may be implemented using techniques that are generally known in the art, further description of these techniques will not be described in detail here. Then the create namespace routine 310 proceeds to block 414 where it terminates.

At block 410, the create namespace routine 310 generates a container object that will be used to implement the new private namespace. If block 410 is reached the actual security attributes of a principle as tracked by an operating system are the same as the security attributes reported in the API call that was received at block 400. In this instance, a container object is created to implement the new private namespace. Those skilled in the art and others will recognize that a feature of container objects is that they may be configured to hold other objects. For example, in some operating systems a file system is implemented internally through the use of a container object. In this regard, when "file objects" are created by the user they are inserted into a container object. In this way, one or more container objects or "directories" are able to organize a file system in a logical manner and provide users with access to file objects that are inserted into the container objects. In any event, in one embodiment of the present invention, a container object is created, at block 410, that is instantiated from a class available from the operating system installed on the computer. Since instantiating a container object from an available class may be performed using techniques that are generally known in the art, further description of the techniques performed at block 410 to create a container object will not be described in further detail here.

As illustrated in FIG. 4, at block 412, a handle is returned to the current process from which the container object created at block 410 may be accessed. Those skilled in the art and others will recognize that a handle is a token, typically implemented as a pointer, that enables a program to access an object. However, since communicating data that includes a handle to the current process may be implemented using techniques that are generally known in the art, further description of these techniques will not be described in detail here. Then the create namespace routine 310 proceeds to block 414 where it terminates.

As mentioned previously, legitimate programs frequently use a named object to implement program functionality such as inter-process communication, process synchronization, and the like. In accordance with one aspect of the present invention, after a container object that implements a private namespace has been created by the create namespace routine 310 described above with reference to FIG. 4, a named object may be created and automatically inserted into the private namespace. Also, a previously created named object may be opened. For example, a series of API calls may be made to an operating system to create and/or open a named object that was previously inserted into a container object.

Another aspect of the present invention that is associated with the create namespace routine 310 described above, is a mechanism to "delete" a private namespace. Those skilled in the art and others will recognize that APIs implemented using objects are frequently provided as a family of API calls. In this regard, aspects of the present invention allow users to create a private namespace by issuing an API call that defines the boundary of the private namespace. Moreover, in accordance with another aspect of the present invention, a related API call may be generated to delete a private namespace once the functionality of a private namespace is no longer needed. Significantly, providing a mechanism to delete a private namespace allows the principle that caused the namespace to be created to control the lifetime of the namespace. Moreover, those skilled in the art and others will recognize that causing a container object that implements a private namespace to be deleted assists in facilitating the memory management functions of the computer.

Figure 5:
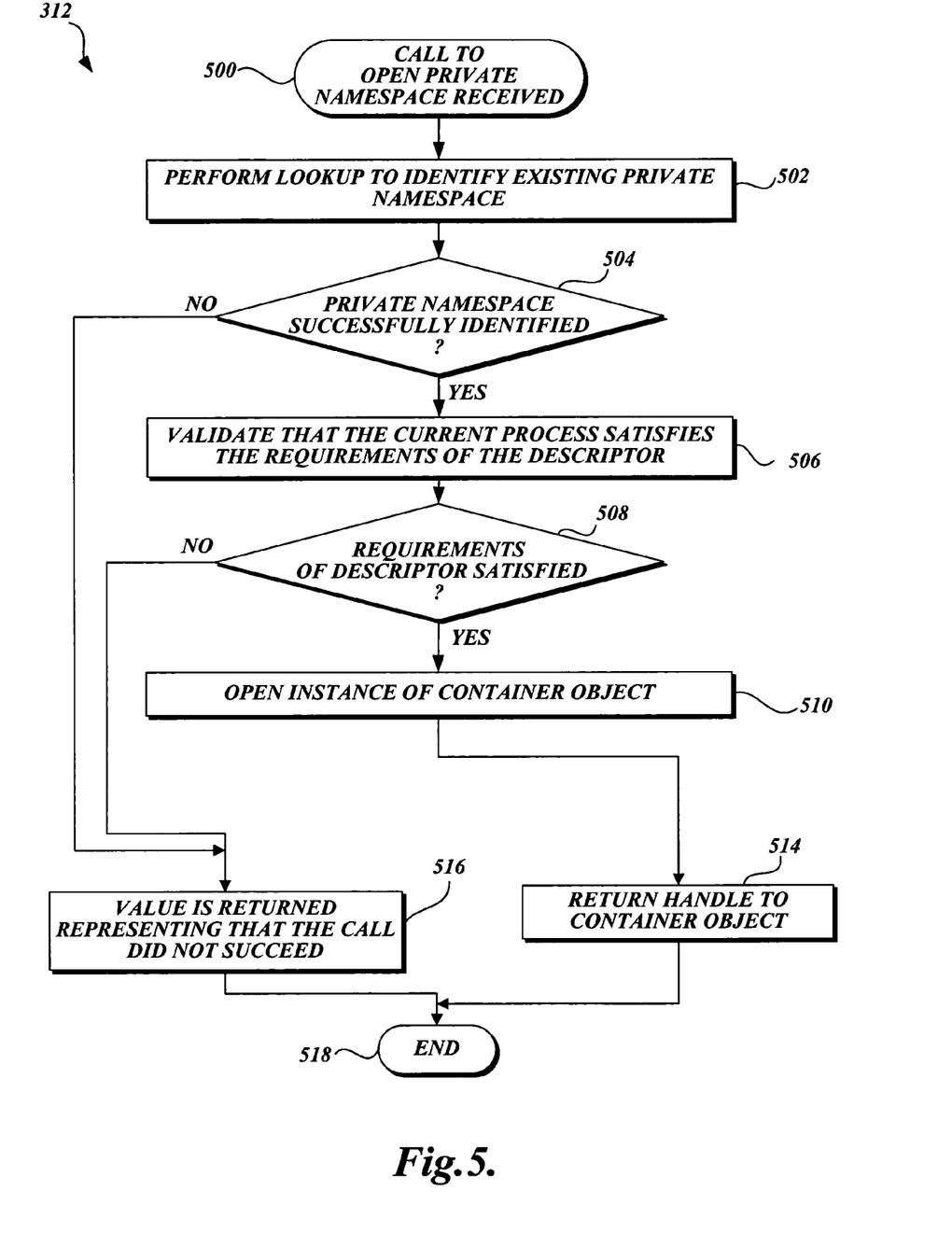
FIG. 5 is a pictorial depiction of an exemplary flow diagram for opening a private namespace.

Now with reference to FIG. 5, an exemplary embodiment of a open namespace routine 312, briefly mentioned above with reference to FIG. 3 will be described in further detail. As a preliminary matter, it should be well understood that the open namespace routine 312 is configured to work in conjunction with the create namespace routine 310 described above with reference to FIG. 4. In any event, those skilled in the art and others will recognize that in order to access named objects that are inserted into a private namespace and perform actions on those named objects, the container object that holds the named objects is initially "opened." The open namespace routine 312, described with reference to FIG. 5 illustrates one exemplary method of opening a private namespace in a way that guarantees that the creator of a named object maintains certain security attributes. Now with continuing reference to FIGS. 1-4, an exemplary embodiment of an open namespace routine 312 will be described.

As illustrated in FIG. 5, the open namespace routine 312 begins at block 500 where a call to open a private namespace is received. Similar to the description provided above with regard to the create namespace routine 310 (FIG. 4), the open namespace routine 312 may begin when a program issues an API call to the interface of an operating system for the purpose of opening a private namespace. For example, in the context of FIG. 3, "PROGRAM B" 316 may issue a call to the interface 304 to open a previously created private namespace. In response, the open namespace routine 312 performs the necessary actions to open the identified namespace so that any objects in the namespace may be accessed. In this regard, arguments are received when the API call is issued that define, among other things, the expected security attributes of a principle that created the private namespace.

As illustrated in FIG. 5, at block 502, the open namespace routine 312 performs a lookup for a private namespace that is identified in the API call obtained at block 500. In accordance with one embodiment, when a private namespace is created, a set of data is obtained that defines a boundary of the namespace. For example, as mentioned previously, the boundary of the private namespace may be defined by a principle's security attributes, integrity level, and the like. Moreover, metadata, such as a name, is associated with a private namespace that may be used in conjunction with data that defines the boundary of the namespace to identify the namespace. The open private namespace routine 312 performs a lookup, at block 502, for a container object that matches the arguments in the API call generated a block 500. In this regard, it should be well understood that multiple private namespaces may exist that are assigned the same name. However, as mentioned previously, the identity of a private namespace is defined by a name and boundary-defining security attributes of the principle that created the private namespace. Thus, multiple private namespaces may exist with the same name with different boundary-defining security attributes. In any event, a lookup is performed at block 502 for a private namespace that matches the arguments in the API call obtained at block 500.

At decision block 504, a determination is made regarding whether the previously performed lookup successfully identified a private namespace. As mentioned previously, a lookup is performed, at block 502, for a private namespace with a name and a set of boundary-defining security attributes that match the API call received at block 500. If a container object with the matching information is identified, the open private namespace routine 312 proceeds to block 506. Conversely, if a matching container object is not identified, the open private namespace routine 312 proceeds to block 516.

At block 506, the open namespace routine 312 validates whether the current process satisfies the requirements imposed by a descriptor that is associated with a private namespace. Those skilled in the art and others will recognize that a descriptor (sometimes referred to as a "security descriptor") refers to a data structure that defines a principle's rights with respect to a container object. In this regard, a descriptor may specify that a user, group, etc., may or may not read, write, query, or create objects inside the container object. In accordance with one aspect of the present invention, a private namespace may place restrictions on the way in which a principle may access objects that are contained in the private namespace. At block 506, the permissions defined by the descriptor of the private namespace are compared to the attributes of the principle that is associated with the current process to determine whether the private namespace may be opened.

At decision block 508, the open namespace routine 312 determines whether the principle associated with the current process has the right to access the namespace specified in the API call received a block 500. As mentioned previously, a comparison is performed, at block 506, between a descriptor associated with a private namespace and the attributes of a principle. If the principle has the right to access the identified namespace, the open private namespace 312 routine proceeds to block 510. Conversely, if the principle associated with the current process does not have as the private namespace for the requested rights the open namespace routine 312 proceeds to block 516, described in further detail below.

At block 510, the open namespace routine 312 causes the container object that is identified in the API call received a block 500 to be "opened." If block 510 is reached, an API call directed at opening a private namespace was identified that will succeed. As mentioned previously with reference to FIG. 4, a container object is used to implement a private namespace. Moreover, in accordance with one embodiment, container objects are instantiated from a class available from an operating system that is installed on the computer. Thus, opening the relevant container object, at block 510, may be performed by issuing a call to an operating system. As a result, the container object that implements the private namespace and any named-objects in the container object, are loaded into the memory address space of the current process.

As illustrated in FIG. 4, at block 514, a handle is returned from which the container object opened at block 510 may be accessed. As mentioned previously with reference to FIG. 4, those skilled in the art and others will recognize that a handle is a token, typically implemented as a pointer, that enables a program to access an object. However, since communicating data that includes a handle to the current process may be implemented using techniques that are generally known in the art, further description of these techniques will not be described in detail here.

Similar to the description provided above with reference to FIG. 4, a handle to a container object may be used to access the container object that implements the private namespace. In this regard, newly created objects may be automatically inserted into a private namespace or existing objects that are already in the private namespace may be accessed when the handle is available. However creation of and accessing objects that are in a private namespace is performed when subsequent calls are made to an operating system that is installed on the computer.

At block 516 a value is returned to the current process that issued the call to open the private namespace at block 500, which indicates that the call did not succeed. In some instances, a call to open a private namespace may not succeed. For example, if a lookup is performed and a container object that matches data received in an API call is not identified, the call does not succeed. Those skilled in the art and others will recognize that when an API call is received, data may be communicated back to the calling process, for example, as a return value. In one embodiment of the present invention, the open namespace routine 312 returns a value back to the calling process, at block 516, which indicates that the call to open a private namespace did not succeed. Then the open private namespace routine 312 proceeds to block 518, where it terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method of creating a private namespace, the method comprising:
   (a) receiving a request to create a private namespace that contains data for defining a boundary of the private namespace;
   (b) determining, by a processor, whether a principle associated with a current process has security attributes that are alleged in the request;
   (c) if the principle that is associated with the current process has the security attributes that are alleged in the request, creating, by the processor, a container object that is uniquely identified by the data that defines the boundary of the private namespace;
   (d) in response to a call that is associated with a second principle to open the private namespace, if the container object has attributes that match data received in the call to open the private namespace, making, by the processor, the container object available to the second principle,
   wherein the security attributes associated with the principle define a boundary that defines a context in which the container object was created.

2. The method as recited in claim 1, further comprising if the principle that is associated with the current process does not have the security attributes that are alleged in the request, preventing the private namespace from being created.

3. The method as recited in claim 1, wherein multiple private namespaces may be created that are assigned the same name with different boundaries; and
   wherein private namespaces that are assigned the same name may be differentiated based on the security attributes of the principle that generated the request.

4. The method as recited in claim 1, wherein the request is issued in a application programming interface call to an operating system installed on the computer; and
   wherein the request includes a unique security identifier assigned to the principle by the operating system that generated the request.

5. The method as recited in claim 1, further comprising preventing malware from preemptively creating a named object that is used by a program by determining, when another request to create the private namespace is received from with the malware, that the malware has the same security attributes that are alleged in the request received from the principle that is associated with the current process.

6. The method as recited in claim 1, wherein the private namespace is implemented as a container object that is instantiated from a class provided by an operating system installed on the computer; and
   wherein a named object is inserted into the container object in a second application program interface call.

7. The method as recited in claim 1, wherein determining whether the principle associated with the current process has security attributes that are alleged in the request includes comparing the data received in the request with the data obtained from an operating system that identifies the security attributes of the principle that generated the request.

8. The method as recited in claim 1, wherein determining whether the principle associated with the current process has security attributes that are alleged in the request is performed by a software component that is executed when an operating system of the computer is in kernel mode.

9. A computer-readable storage medium containing computer-readable instructions that when executed in a computer that includes an operating system perform a method of preventing collisions on a named object, the method comprising:
   (a) in response to a call that is associated with a first principle to create a private namespace:
      (i) determining whether the first principle maintains the same security attributes that are alleged in the call to create the private namespace;
      (ii) if the first principle maintains the security attributes that are alleged in the call to create the private namespace, creating a container object to hold the named object;
   (b) in response to a call that is associated with a second principle to open the private namespace, determining whether the container object has security attributes that match the data received in the call to open the private namespace; and
   (c) if the container object has attributes that match the data received in the call to open the private namespace, making the container object available to the second principle,
   wherein the security attributes associated with the first principle define a boundary that defines a context in which the container object was created.

10. The computer-readable storage medium as recited in claim 9, wherein making the container object available to the second principle includes performing a lookup to determine whether the container object has a name and security attributes that are specified in the call to open the private namespace.

11. The computer-readable storage medium as recited in claim 9, wherein the named object may be used to:
   (a) perform interprocess communication; and
   (b) synchronize execution of multiple processes.

12. The computer-readable storage medium as recited in claim 9, wherein the call to open the private namespace will only be satisfied if the first principle is inside the boundary in which the container object was created;
   and wherein a call to delete the private namespace will only be satisfied if the first principle is inside the boundary in which the container object was created.

13. The computer-readable storage medium as recited in claim 9, wherein determining whether the container object has security attributes that match the data received in the call to open the private namespace includes determining if a security descriptor prevents the second principle from opening the container object.

14. The computer-readable storage medium as recited in claim 9, wherein the container object is created from a directory class provided by the operating system installed on the computer.

15. A software system for preventing a malware from preempting the use of a named-object, the software system comprising:
   a computer comprising memory having stored thereon computer-executable components, the computer-executable components, executed in the computer, comprising:
      (a) a create namespace routine operative to create a private namespace that defines a boundary of the private namespace based on validated security attributes of a principle that generated a request to create the private namespace;
      (b) an open namespace routine for providing access to the private namespace created by the create namespace routine when a call that matches the security attributes that define the boundary of the private namespace is received; and
      (c) an object manager for providing and managing objects that are instantiated on the computer including a container object created by the create namespace routine; and
   an interface that may be called by a program installed on the computer for the purpose of executing the create namespace routine.

16. The software system as recited in claim 15, further comprising a data store operative to store arguments when a call to create a private namespace is received including a set of security attributes.

17. The software system as recited in claim 15, wherein the open namespace routine is further configured to ensure that the principle is inside the boundary of the private namespace by comparing a set of data received in an application interface call with data tracked by an operating system.

* * * * *